US007523574B2

(12) United States Patent
Henick et al.

(10) Patent No.: US 7,523,574 B2
(45) Date of Patent: Apr. 28, 2009

(54) SELF-CENTERING MOBILE

(76) Inventors: Sanford Henick, 5439 Winters Way, Greensboro, NC (US) 27410; Robert Henick, 20 Hunt Club Rd. Apt. E, Greensboro, NC (US) 27410

( * ) Notice: Subject to any disclaimer, the term of this patent is extended or adjusted under 35 U.S.C. 154(b) by 801 days.

(21) Appl. No.: 10/781,039

(22) Filed: Feb. 17, 2004

(65) Prior Publication Data

US 2005/0178036 A1 Aug. 18, 2005

Related U.S. Application Data

(60) Provisional application No. 60/447,559, filed on Feb. 14, 2003, now abandoned.

(51) Int. Cl.
*G06F 7/22* (2006.01)

(52) U.S. Cl. .......................... 40/617; 446/227; D6/301

(58) Field of Classification Search .................. 40/617; 446/227; 428/7-11; D6/301
See application file for complete search history.

(56) References Cited

U.S. PATENT DOCUMENTS

| | | | | | |
|---|---|---|---|---|---|
| 2,466,243 | A | * | 4/1949 | Johnson | 59/95 |
| 2,769,276 | A | * | 11/1956 | Steiner | 446/227 |
| 2,994,156 | A | | 8/1961 | Steiner et al. | |
| 4,510,189 | A | | 4/1985 | Girard | |
| 4,567,682 | A | | 2/1986 | Hurxthal | |
| 4,729,182 | A | | 3/1988 | Sherman | |
| 4,860,477 | A | * | 8/1989 | Gooch | 40/603 |
| 4,880,197 | A | | 11/1989 | Wsyzynski | |
| 5,329,874 | A | * | 7/1994 | Posey | 116/222 |
| 5,606,816 | A | | 3/1997 | Schwartz | |
| 5,791,775 | A | | 8/1998 | Douglass, II | |
| 6,068,535 | A | | 5/2000 | Hoyt | |
| D444,633 | S | | 7/2001 | Henick | |
| D459,898 | S | | 7/2002 | Henick | |
| D460,273 | S | | 7/2002 | Henick | |
| D465,932 | S | | 11/2002 | Henick | |
| 6,494,506 | B1 | * | 12/2002 | Gleason et al. | 292/216 |
| D474,616 | S | | 5/2003 | Henick | |
| D474,899 | S | | 5/2003 | Henick | |
| D479,654 | S | | 9/2003 | Henick | |
| D479,772 | S | | 9/2003 | Henick | |
| 2001/0055931 | A1 | | 12/2001 | Khamphilavong et al. | |
| 2002/0094748 | A1 | | 7/2002 | Baik | |

OTHER PUBLICATIONS

Nursery Butterflies by Kenner, 1953, Kenner Production company.*

(Continued)

*Primary Examiner*—Cassandra Davis
(74) *Attorney, Agent, or Firm*—Kilpatrick Stockton LLP

(57) ABSTRACT

A mobile comprising a frame, one or more mobile arms, freely rotatable connectors, and display members provide a self-centering and balanced mobile. Freely rotatable connectors can include a spinner assembly and spring clips. The mobile arms and display members can rotate a full and continuous 360 degrees to display items such as photographs on multiple sides of the display member. Display enclosures include balanced construction and thumb cut-outs for ease of access to items displayed in the enclosures. Such self-centering mobiles can be mounted on a variety of surfaces, such as on a table, from a wall, on office systems mounting surfaces, on shelving, and on computer terminals.

6 Claims, 8 Drawing Sheets

OTHER PUBLICATIONS

Rose, Timothy, Interactivity-Exploring the Fine Art of Mobiles, Chronicle Books, San Francisco (2000).
Learning Curve Toys, Lamaze Infant Development System (1996).
The Right Start Babies to Kids, Holiday 1998 Catalog, p. 46, Westlake Village, CA (1998).

* cited by examiner

SELF-CENTERING MOBILE

CROSS-REFERENCE TO RELATED APPLICATIONS

This application claims priority to U.S. Provisional Patent Application No. 60/447,559, filed Feb. 14, 2003, which is incorporated herein in its entirety.

FIELD OF THE INVENTION

The present invention relates to mobiles and in particular to mobiles having self-centering and balanced arms, connectors, and display members. Embodiments of the present invention provide mobile display members and arms that freely rotate a continuous 360 degrees.

BACKGROUND OF THE INVENTION

A mobile is defined as a type of sculpture consisting of carefully equilibrated parts that move, especially in response to air currents. Mobiles have been made for many years. Engineering principles were applied to the art of mobile-making in the early and mid-twentieth century by the American artist Alexander Calder, who is known as the "Father of the Mobile." One aim of such a sculpture is to depict movement, that is, kinetic rather than static rhythms. In a conventional mobile, display objects of the same or varying shapes are suspended, for example, from a hook attached to a wire. The display objects are attached to a support structure. A hook is positioned at the fulcrum, or balance point, of the support structure such that support structure and the display objects are balanced. The balance point in a mobile is affected by the weight of the objects being displayed and the distance the objects are located from each other along the fulcrum about which the objects are suspended. Mobiles can include sub-assemblies of one or more display objects that are arranged to form a branching, or "tree" mobile. Display objects can be positioned along the balanced display axis in symmetrical or asymmetrical arrangement. Jump rings, or small circle loops, can be added to the structure from which the objects are suspended to add rotational movement of the objects.

However, conventional mobiles that include such connections between support arms and display elements allow displayed items to move clockwise or counterclockwise in less than a full or continuous 360 degree rotation. Display elements of conventional mobiles encounter some degree of torque as the display elements rotate, and often succeed in rotating less than 180 degrees before stopping and turning in the opposite direction. Such mobiles have the disadvantage of preventing full circumferential movement of the displayed items such that a person may not be able to view all sides of the displayed item without manipulating the displayed item or moving to the other side of the mobile to view it.

Conventional mobiles do not include arms, connection elements, and display members that cooperate to provide a self-centering and balanced mobile. In particular, conventional mobiles fail to allow display of combinations of vertically-oriented and horizontally-oriented display members that together are self-centering and balanced.

Thus, there is a need to provide a mobile that is self-centering and balanced and that provides full and continuous 360 degree rotation of displayed items.

SUMMARY OF THE INVENTION

The present invention provides a self-centering and balanced mobile having a full and continuous 360 degree rotation of its arms and display members.

In an embodiment, a self-centering mobile of the present invention includes a frame, a plurality of freely rotatable connectors, and a horizontally disposed arm having two ends and a balance point between the two ends. The arm is suspended from the frame at the balance point with one of the freely rotatable connectors. A display member is suspended from each end of the arm with another one of the freely rotatable connectors. The display members have a weight so that the arm is balanced when it suspended from the frame at the arm balance point.

In one embodiment, the mobile arm comprises a substantially closed loop at the balance point and at each end of the arm. The arm can comprise a continuous, round rod of substantially rigid material. Preferably, the rod of material includes spring steel. In embodiments, the rod of material comprises a coating that includes zinc, which provides a surface with a lower coefficient of resistance that contributes to the self-centering characteristic of the present invention.

The freely rotatable connectors can include a spinner assembly adapted to rotate freely for 360 degrees in both clockwise and counter-clockwise directions. One such spinner assembly has a hollow central body with an aperture in both the top and bottom of the body. The central body has an eye hook disposed in both its top and bottom. Each eye hook has a base larger than the apertures and is rotatably secured inside the central body. The hook portion of the eye hook extends through the aperture. The connectors also include a means for attaching the spinner assembly to the frame and to the arm.

One embodiment of a means for attaching the spinner assembly to the frame and to the arm comprises a spring clip formed from a round rod of spring steel. The rod is formed into a substantially closed "S" shape. Each end of the rod is bent outwardly from the spring clip to form a receiving channel to help guide the frame and the arm into the rounded portions of the spring clip. Preferably, the spring steel rod of the spring clip has a coating that includes zinc, which provides a smooth contact with the mobile arm and facilitates self-centering of the display member supported by the spring clip on the mobile arm.

In embodiments, a mobile of the present invention has a plurality of display members suspended from one or both ends of the arm. In this case, the balance point is located on the arm at a pre-determined point such that a particular combination of display members is balanced. In another combination of the present invention, at least one other arm is suspended from one or both ends of the arm with one of the freely rotatable connectors.

In another aspect of the present invention, the display member comprises a display enclosure that includes a single, flat sheet of transparent material folded over onto itself to form opposing panels for receiving a substantially flat item for display between the panels. Preferably, the transparent material includes polyethylene terephthalate glycol (PETG). The panels can have an aperture near the top and through the panels for connecting the panels to a freely rotatable connector. The panels are spaced apart approximately one millimeter (mm) to form a bottom for supporting the display item and for facilitating movement of the display item between the panels. In one embodiment, at least one panel has a cutout near an edge of the panel for facilitating insertion and removal of the display item between the panels.

A mobile of the present invention can include a plurality of display enclosures of differing dimensions and that are oriented for vertical display or for horizontal display. Display enclosures having the same dimensions also have the same weight, and can therefore be interchanged for vertical or horizontal display.

In another aspect of the present invention, a mobile includes a means for mounting the frame to a surface, either in a stationary or adjustable manner. One such means for mounting a frame in a stationary manner includes an oblong block of material having a bore hole extending at least partially downward through the block toward the bottom for fittingly receiving the frame. A threaded hole extends through the front of the block approximately perpendicularly to and intersecting with the bore hole. A screw can be threaded through the threaded hole for tightening against the frame to secure the frame in the bore hole.

Another embodiment of a means for mounting the frame to a surface allows the frame to be mounted in an adjustable manner. For example, a block of material has two holes extending at least partially through the block in approximately perpendicular directions. One hole is a bore hole for fittingly receiving the frame. The other hole is a threaded hole intersecting with the bore hole. A first screw is inserted into the threaded hole for tightening against the frame to secure the frame in the bore hole. A second screw is inserted through another hole in the block perpendicular to the bore hole and through a threaded hole in the block-mounting portion of a bracket. As such, the block and frame can be adjusted and secured in a range of positions within an approximately 90 degree angle around an upright position.

Another embodiment for adjustably mounting the frame to a surface includes a circular block of material having a plurality of holes about the circumference that extend at least partially through the block in approximately perpendicular directions. Each pair of holes includes a bore hole for fittingly receiving the frame and a threaded hole intersecting with the bore hole. A first screw can be inserted into the threaded hole for tightening against the frame to secure the frame in the bore hole. A second screw can be inserted through another threaded hole in the circular block perpendicular to the plurality of paired bore holes and threaded holes and into a threaded hole in the front of a rectangular block. Accordingly, the circular block and frame can be adjustably secured in a range of positions within a 360 degree span.

In either of these means for mounting the frame to a surface, such as a wall or desk, an adhesive may be applied to the back of the block for attaching the block and frame to the surface. Embodiments of the present invention include methods of using a self-centering mobile. One such embodiment includes the steps of providing a frame, a plurality of freely rotatable connectors, and a horizontally disposed arm comprising a round rod of spring steel and a substantially closed loop at each of two ends and at a balance point between the two ends. The arm can be suspended from the frame at the balance point with one of the freely rotatable connectors. A display member can be suspended from each end of the arm with another one of the freely rotatable connectors. The display members have a weight so that the arm is balanced when suspended from the frame at the arm balance point.

In another embodiment of a method, the arm can be suspended from the frame and the display member can be suspended from each end of the arm with a spring clip formed from a round rod of spring steel into a substantially closed "S" shape. Each end of the rod is bent outwardly from the spring clip to form a receiving channel for receiving the frame and the arm. One of the spring clips is attached to the top and another spring clip is attached to the bottom of a spinner assembly. The spinner assembly is adapted to rotate freely for 360 degrees in both clockwise and counter-clockwise directions. A plurality of display members can be suspended from at least one end of the arm, and the balance point is located on the arm at a pre-determined point such that a particular combination of display members is balanced. At least one other arm can be suspended from at least one end of the arm with one of the freely rotatable connectors.

Features of a self-centering mobile of the present invention may be accomplished singularly, or in combination, in one or more of the embodiments of the present invention. As will be appreciated by those of ordinary skill in the art, the present invention has wide utility in a number of applications as illustrated by the variety of features and advantages discussed below.

A self-centering mobile of the present invention provides numerous advantages over prior mobiles. For example, the present invention advantageously provides a self-centering and balanced mobile.

Another advantage is that the present invention provides a mobile having arms and display members that are each freely rotatable through a full and continuous 360 degrees in both clockwise and counterclockwise directions.

Another advantage is that the present invention provides a mobile having display members, such as photograph enclosures, in which displayed items are easily accessible with a thumb-sized cutout on one or more edges of the display member.

Another advantage is that the present invention provides a self-centering, fully-rotatable mobile adapted for uninterrupted attention-gathering motion useful in point-of-sale advertising, for example, at a check-out counter in a retail store.

Another advantage is that the present invention provides a self-centering, fully-rotatable mobile that is easy and inexpensive to manufacture and to use.

As will be realized by those of skill in the art, many different embodiments of a self-centering mobile according to the present invention are possible. Additional uses, objects, advantages, and novel features of the invention are set forth in the detailed description that follows and will become more apparent to those skilled in the art upon examination of the following or by practice of the invention.

DETAILED DESCRIPTION

The present invention provides a self-centering and balanced mobile having a full and continuous 360 degree rotation of its arms and display members. FIGS. 1-10 show various embodiments of mobiles of the present invention.

Figure 1:
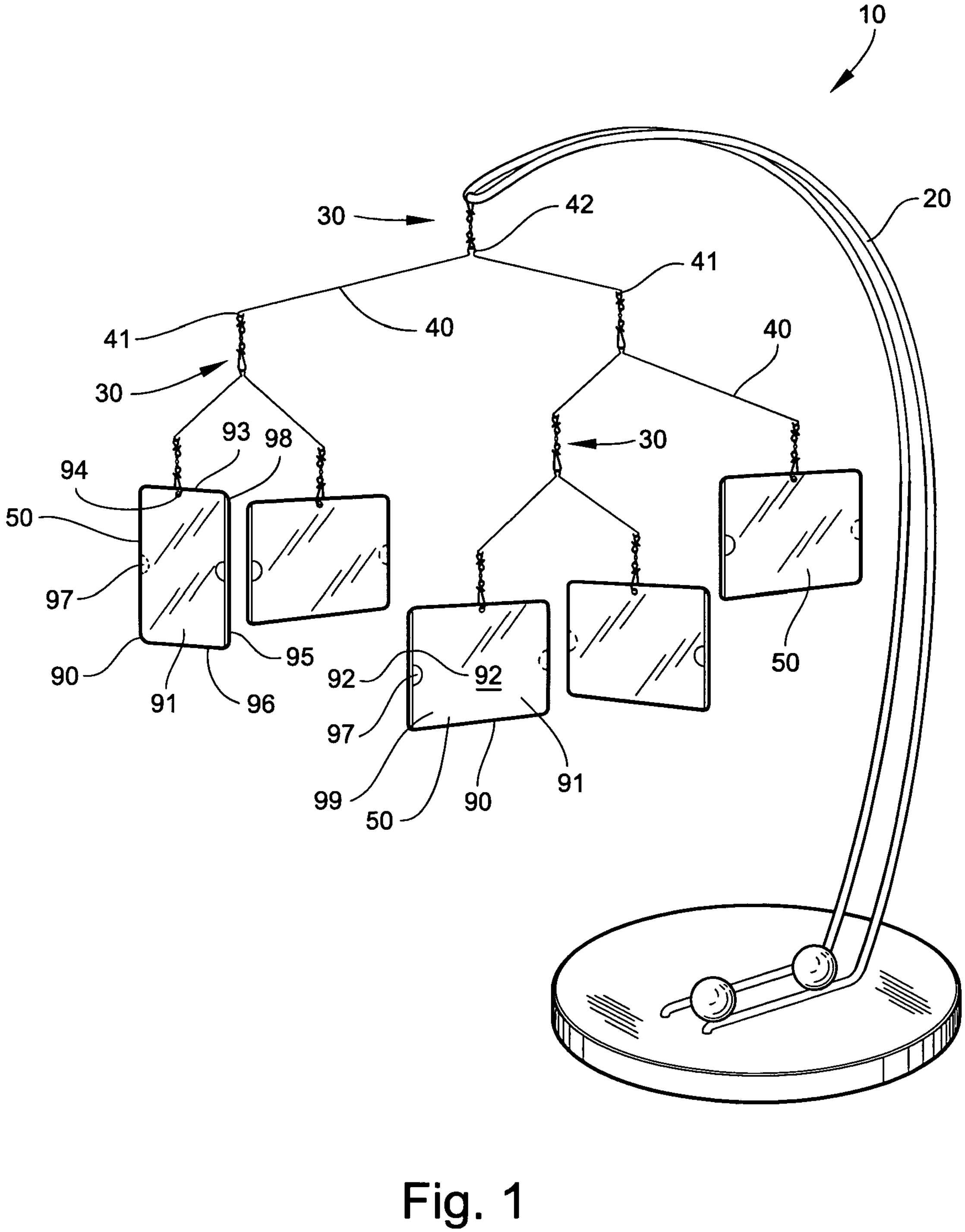
FIG. 1 is a view of a mobile displaying one vertical display enclosure and four horizontal display enclosures in an embodiment of the present invention.
Figure 2:
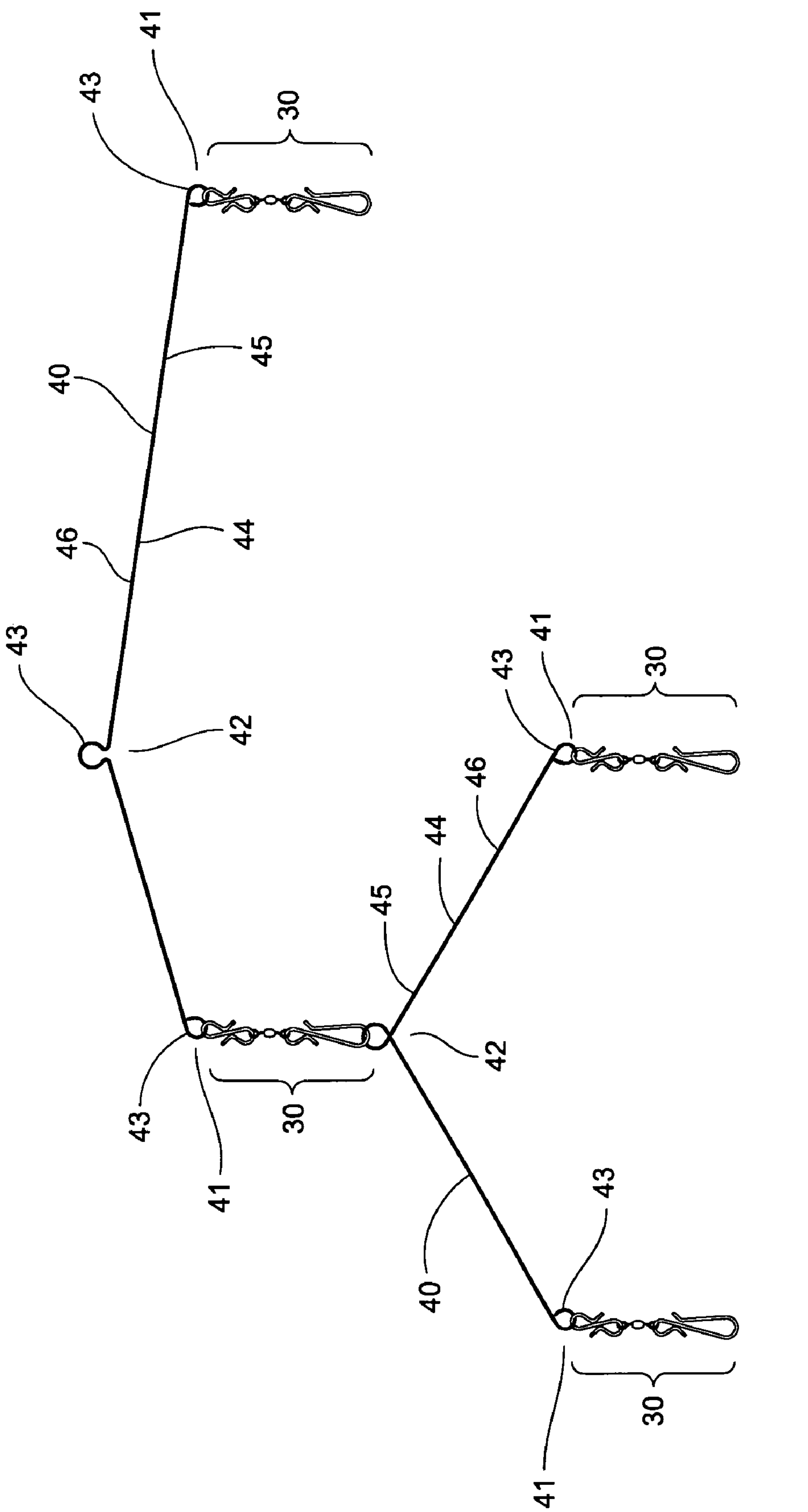
FIG. 2 is a view of mobile arms and freely rotatable connectors in an embodiment of the present invention. The mobile arms show angled mobiles arm having rounded and substantially closed loops.

As shown in the embodiment in FIGS. 1 and 2, a self-centering mobile 10 of the present invention includes a frame 20, a plurality of freely rotatable connectors 30, and a horizontally disposed arm 40 having two ends 41 and a balance point 42 between the two ends 41. The arm 40 is suspended from the frame 20 at the balance point 42 with one of the freely rotatable connectors 30. A display member 50 is suspended from each end 41 of the arm 40 with another one of the freely rotatable connectors 30. The display members 50 have a weight so that the arm 40 is balanced when it suspended from the frame 20 at the arm balance point 42.

The mobile arm 40 comprises a substantially closed loop 43 at the balance point 42 and at each end 41 of the arm 40. The arm 40 can comprise a continuous, round rod 44 of substantially rigid material. Preferably, the rod 44 of material includes spring steel 45.

A mobile superstructure, or frame 20, supports mobile arms 40 and display members 50 from the tops of the arms 50. The frame 20 can be any number of structures that provide a means for suspending a mobile arm 40 and display members 50. For example, a frame 20 can be a support arm 40 mounted to a wall or to other surfaces, such as a work station or computer monitor. Alternatively, a mobile frame 20 can be a table stand. In one embodiment, mobile arms 40 comprise a continuous rod of material in shapes having various angles. For example, a mobile arm 40 can be straight or can have an angle between about 15 degrees and about 175 degrees.

In embodiments of the present invention, the middle and end loops 43 of mobile arms 40 are precision-made utilizing programmable "computer numerical control" ("CNC") wire bending technology. Manufacturing tolerances are held to small ranges to assure consistently made arms 40 and loops 43 in order to help provide the ability to balance and self-center in a suspended mobile 10. The arms 40 can be formed from light stock spring steel 45 having recovery properties, for example music wire. Rods 44 of the present invention can be made from fine tempered, light-gauge music spring steel 45 wire. The round-shaped ends and balance point of the mobile arm 40 have a 360 degree round-to-round surface interaction at points of contact with the generally lighter gauge, for example, 5502-1 and 5502-2 gauge, spring steel connector 30 components, such as a spring clip 70. A round-to-round surface contact allows gravity to maintain the mobile 10 structures on center balance points and thus facilitate balance of asymmetrically arranged display members.

In embodiments, the rod 44 of material comprises a coating 46 that includes zinc, which provides a surface with a lower coefficient of resistance that contributes to the self-centering characteristic of the present invention. A zinc coating 46 provides a harder, smoother, and slicker surface than conventional powder-coated surfaces due to an uneven thickness of application, uneven distribution of particulates in the powder, and presence of contaminants in powder. Such a zinc-coated 46 surface facilitates increased efficiency of rotating motion and prevents rusting. Mobile arms 40 can be any color desired, for example, in one embodiment, mobile arms 40 are black.

Figure 3:
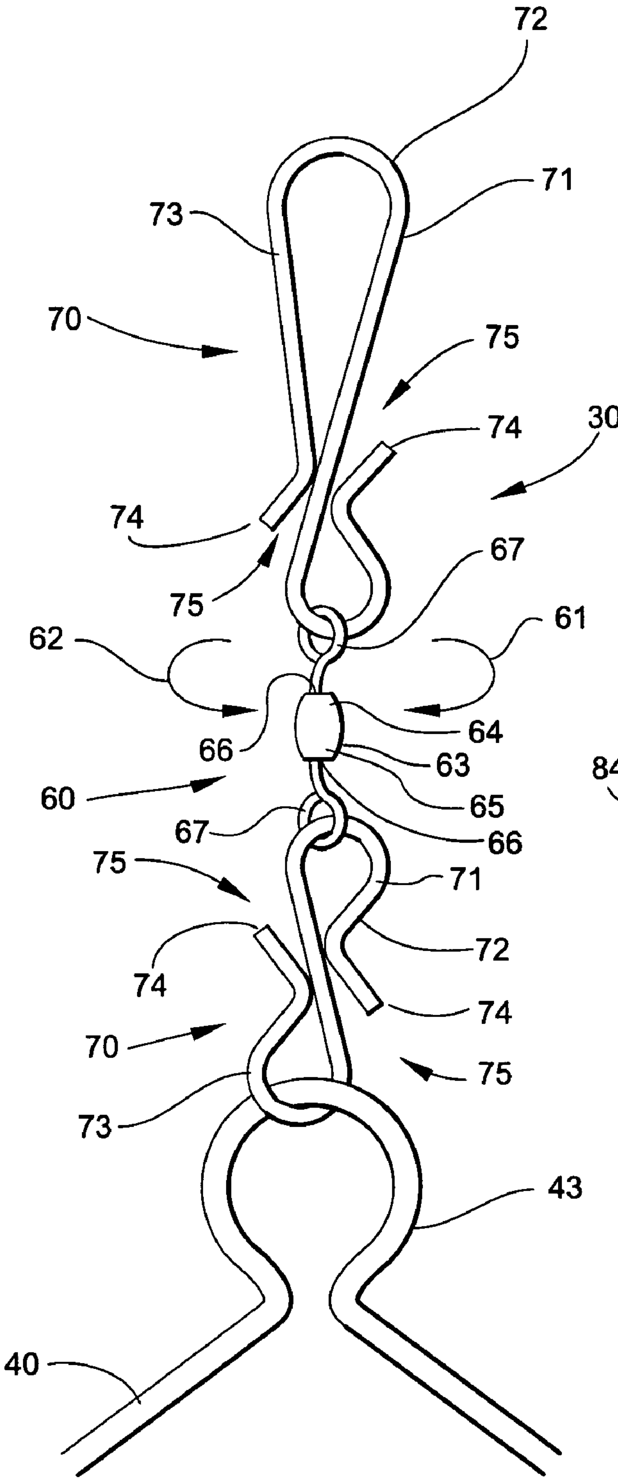
FIG. 3 is a view of a spinner assembly connected to a spring slip at the top and at the bottom in an embodiment of the present invention. The lower spring clip is connected to a closed loop of an arm.

As shown best in FIGS. 2 and 3, the freely rotatable connectors 30 can include a spinner assembly 60 adapted to rotate freely in an uninhibited manner for 360 degrees in both clockwise 61 and counter-clockwise 62 directions. One such spinner assembly 60 has a hollow central body 63 with an aperture 66 in both the top 64 and bottom 65 of the body 63. The central body 63 has an eye hook 67 disposed in both its top 64 and bottom 65. Each eye hook 67 has a base (not shown) larger than the apertures 66 and is rotatably secured inside the central body 63. The hook portion of the eye hook 67 extends through the aperture 66. The connectors 30 also include a means for attaching the spinner assembly 60 to the frame 20 and to the arm 40. One embodiment of a means for attaching the spinner assembly 60 to the frame 20 and to the arm 40 comprises a spring clip 70 formed from a round rod 71 of spring steel 72. The rod 71 is formed into a substantially closed "S" shape 73. Each end 74 of the rod 71 is bent outwardly from the spring clip 70 to form a receiving channel 75 to help guide the frame 20 and the arm 40 into the rounded portions of the "S" shape 73 of the spring clip 70. In embodiments in which the spring clip 70 is made from spring steel 72, after another structure is slid between the outwardly bent end 74 and the body of the spring clip into a rounded portion of the substantially closed loop of the spring clip 70, the spring steel biases the temporary opening between the end 74 and the spring clip 70 body back together to a substantially closed position. As such, the connected structure remains securely positioned on the spring clip 70. Preferably, the spring steel rod 71 of the spring clip 70 has a coating that includes zinc, which provides a smooth contact with the mobile arm 40 and facilitates self-centering of the display member 50 supported by the spring clip 70 on the mobile arm 40.

Spring clips 70 can be made in various sizes to fit onto mobile arms 40 and display members 50. In one embodiment, spring clips 70 for attaching to display members 50 are approximately one inch in length. Spring clips 70 for attaching to a mobile arm 40 can be approximately one-half inch in length. A spring clip 70 can have one loop of the "S" shape larger than the other loop. A longer loop facilitates fitting the spring clip 70 over the end of a display member 50, such as a plastic photograph enclosure. This is particularly helpful when the attachment opening in a photograph display enclosure is located away from the edge of the display member 50.

Figure 4:
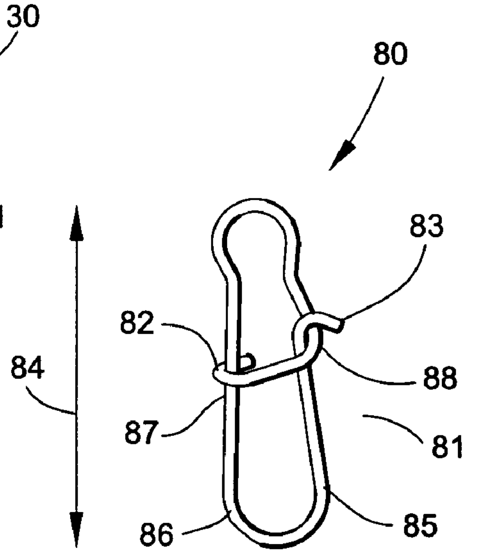
FIG. 4 is a view of dual lock snap fastener in an embodiment of the present invention.
Figure 5:
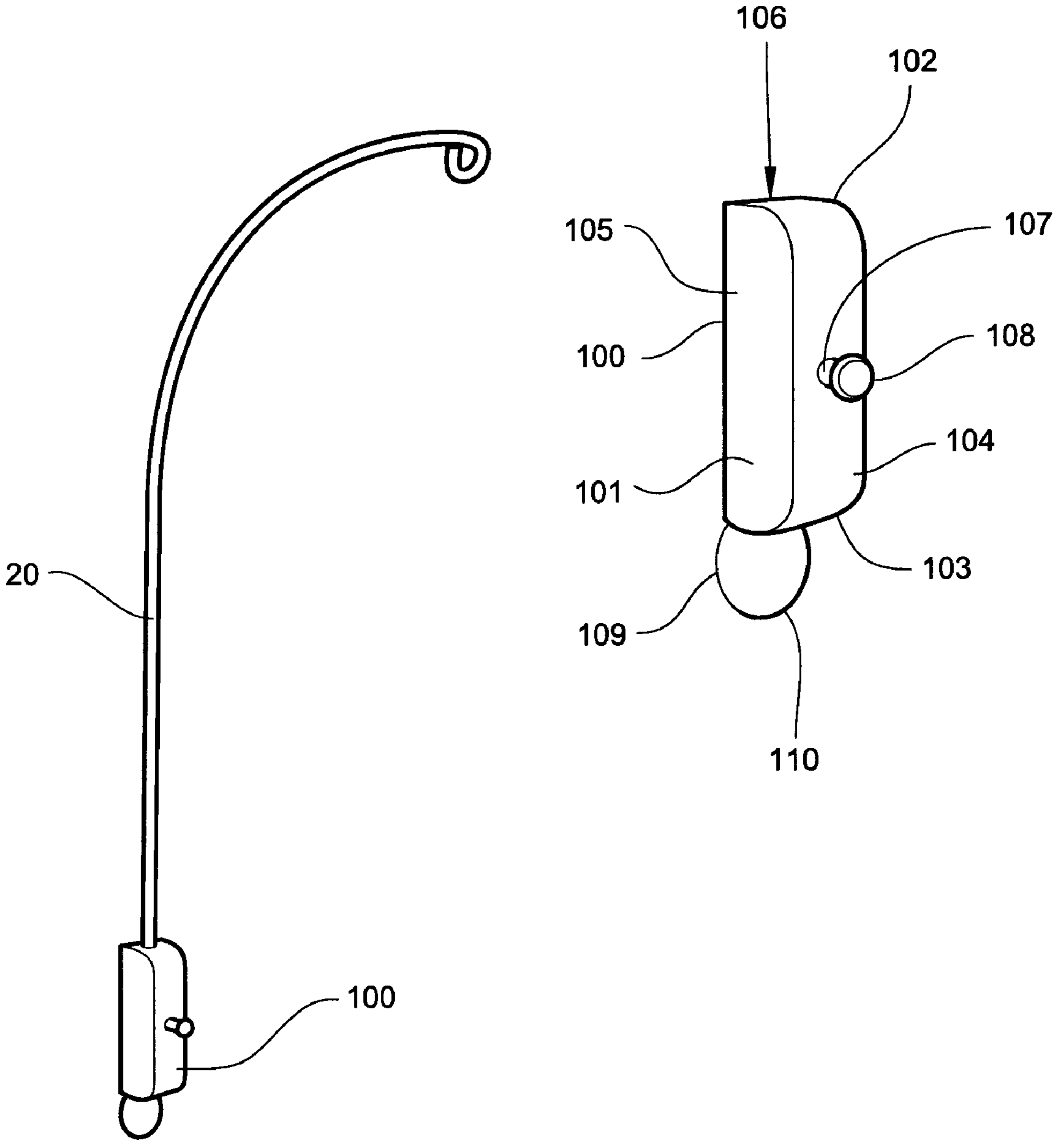
FIG. 5 is a view of a means for stationarily mounting a frame to a surface in an embodiment of the present invention.
Figure 6:
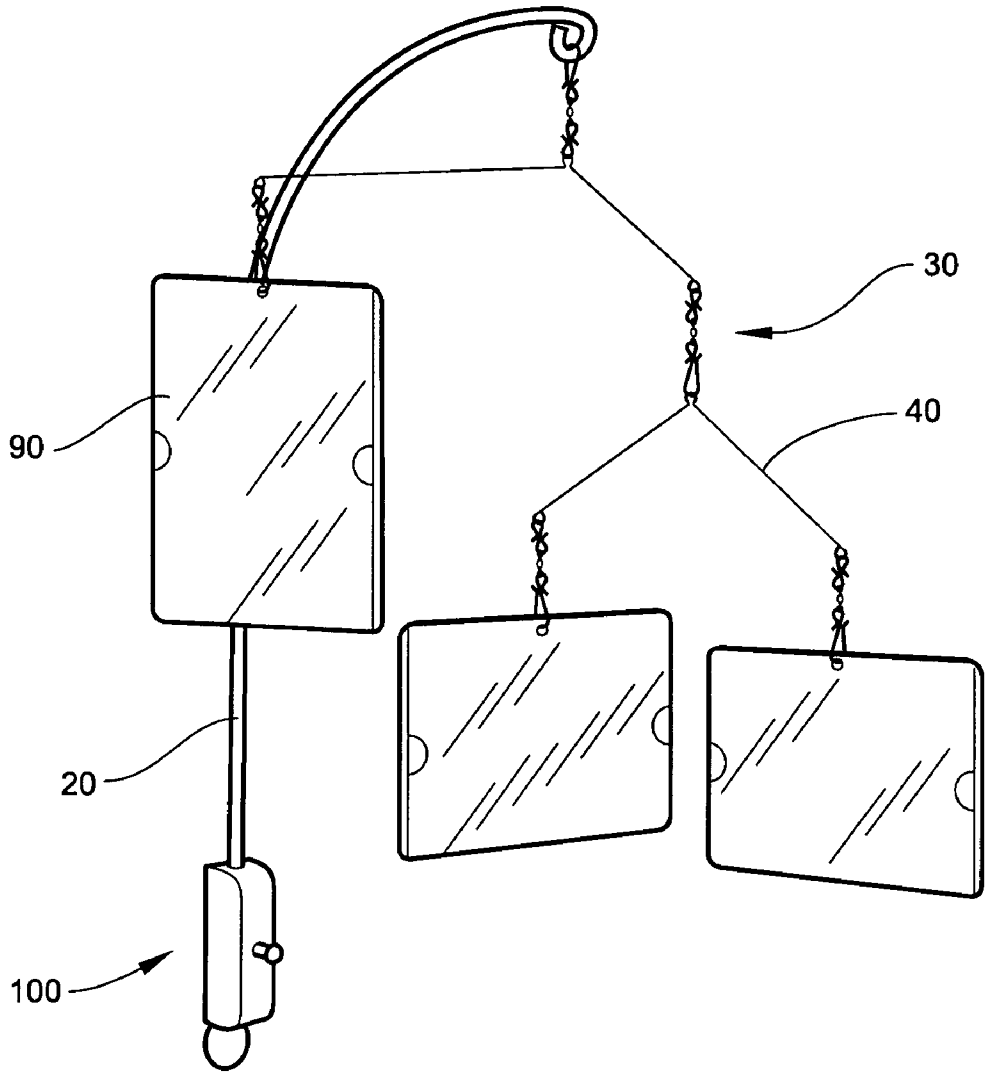
FIG. 6 is a view of the means for stationarily mounting a frame to a surface shown in FIG. 5, with suspended arms and display elements in an embodiment of the present invention.
Figure 7:
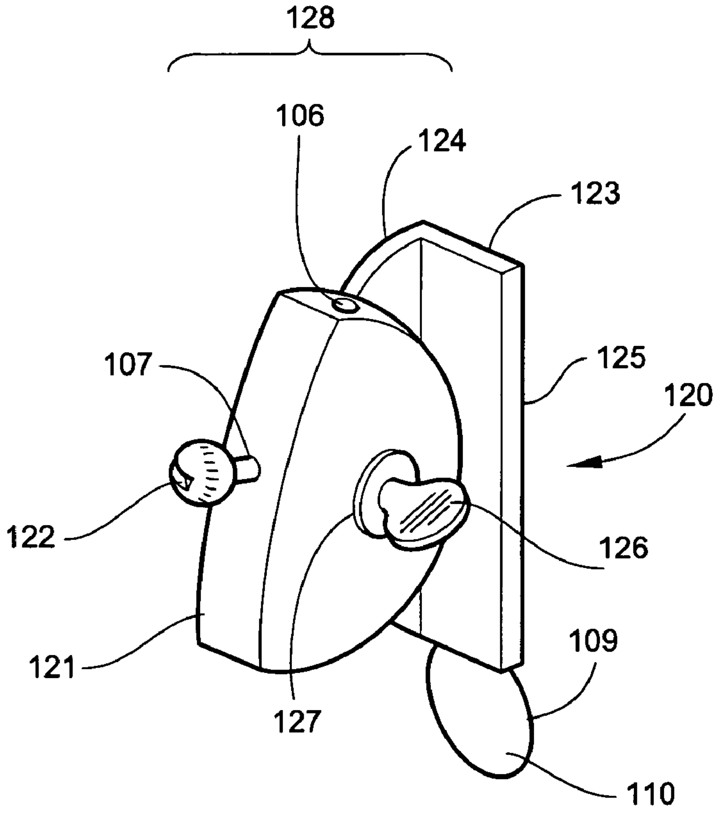
FIG. 7 is a view of a means for adjustably mounting a frame to a surface in an embodiment of the present invention.
Figure 8:
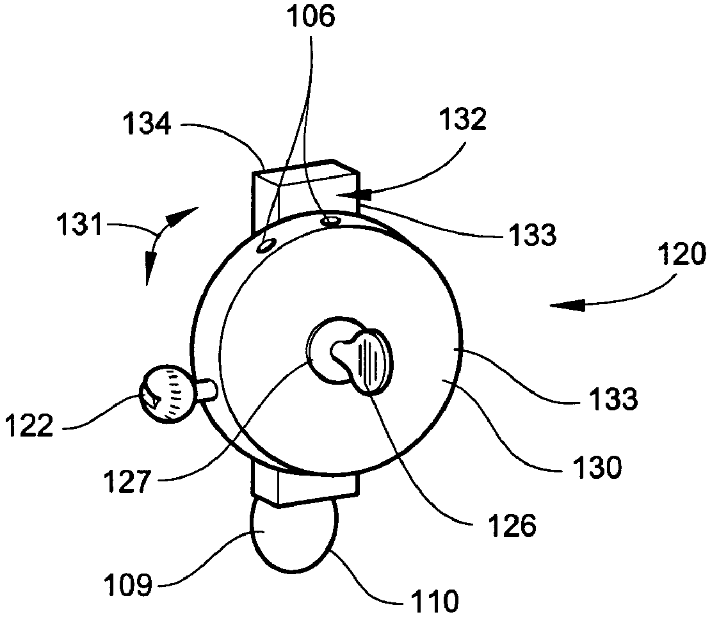
FIG. 8 is a view of a means for adjustably mounting a frame to a surface in another embodiment of the present invention.
Figure 9:
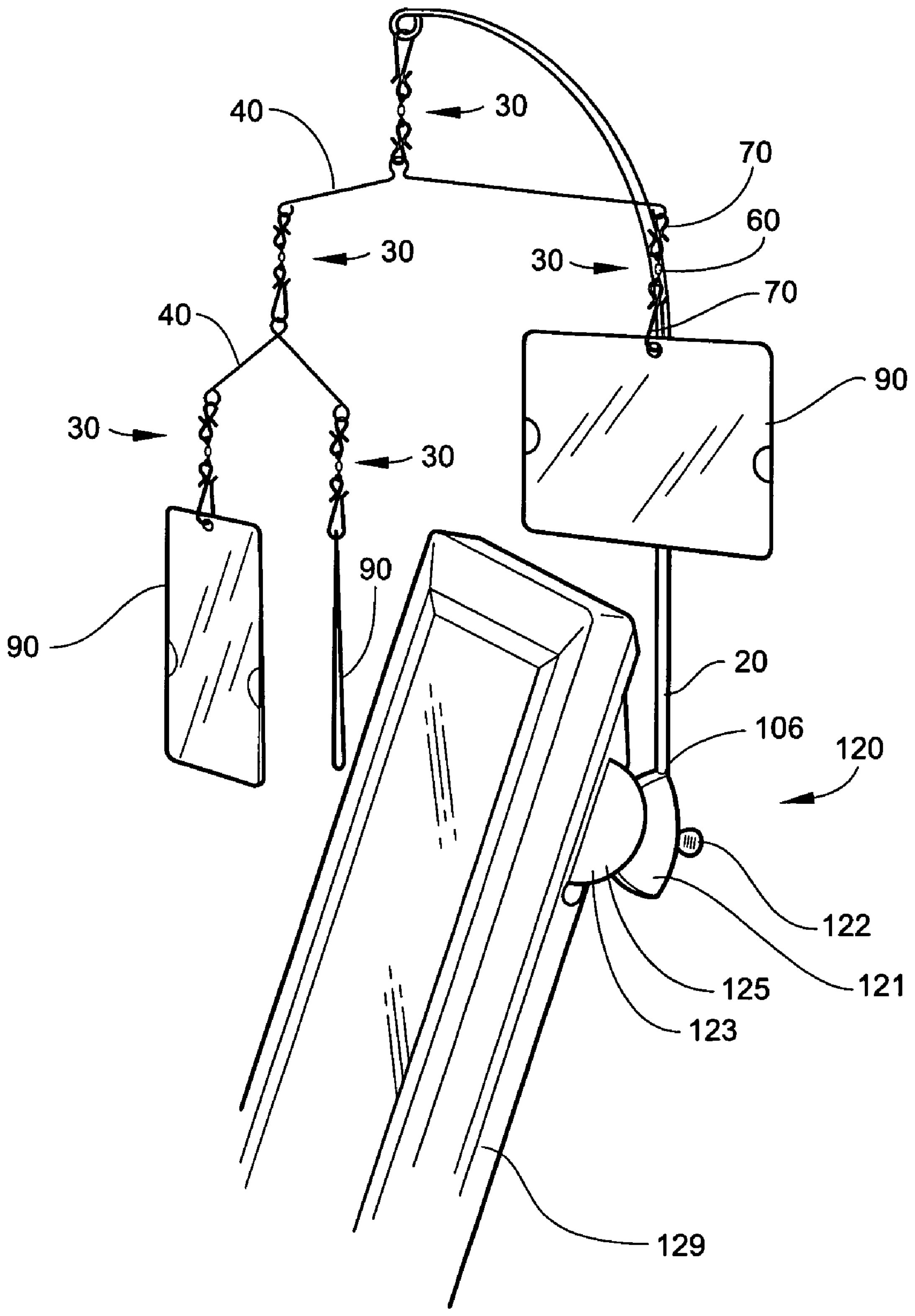
FIG. 9 is a view of the means for adjustably mounting a frame to a surface shown in FIG. 7, with suspended arms and display elements in an embodiment of the present invention.
Figure 10:
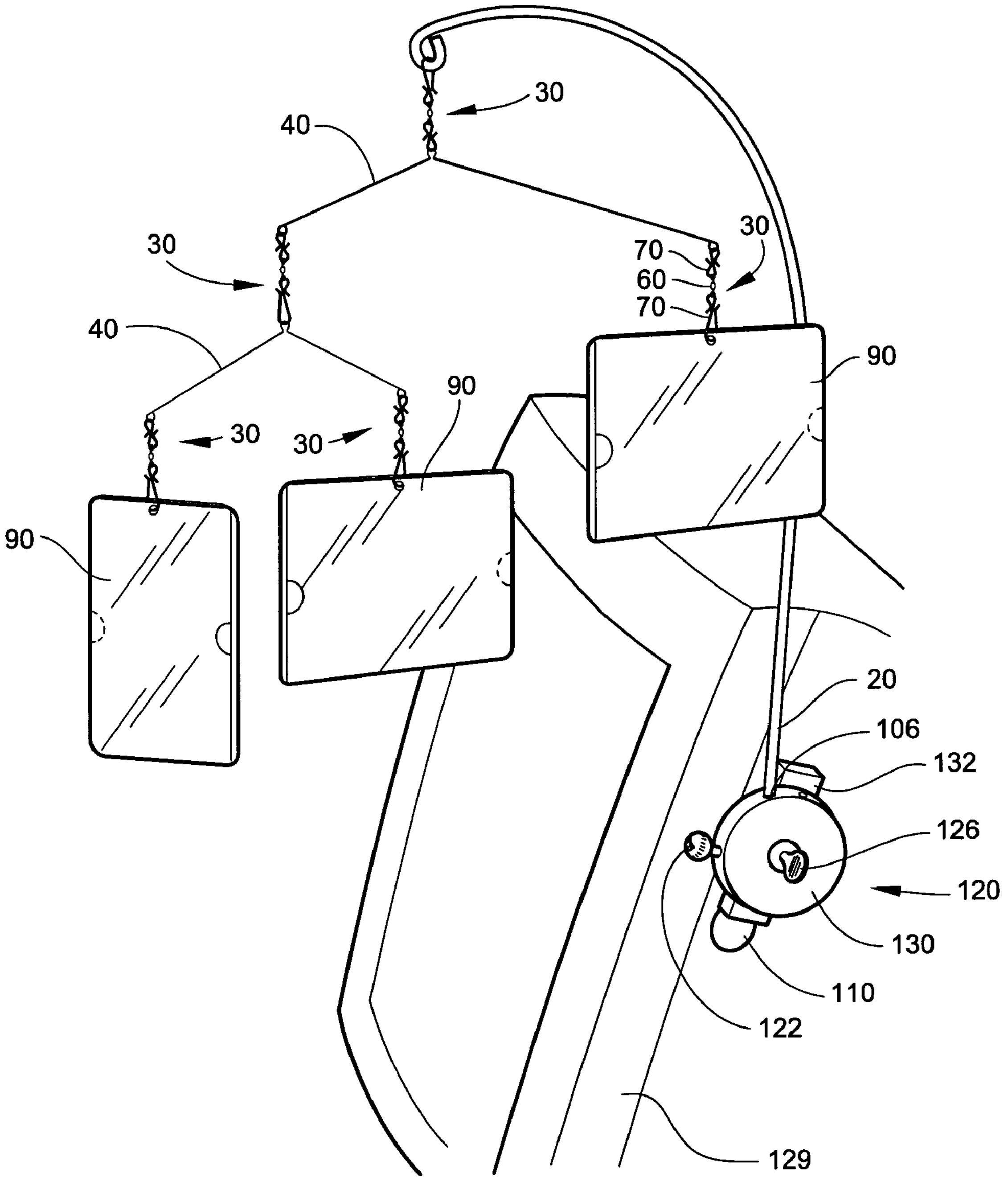
FIG. 10 is a view of the means for adjustably mounting a frame to a surface shown in FIG. 8, with suspended arms and display elements in an embodiment of the present invention.

In an alternative embodiment, the means for attaching the spinner assembly 60 to the frame 20 and to the arm 40 comprises a dual lock snap fastener 80, as shown in FIG. 4. Such a fastener 80 comprises a round rod of spring steel formed into an elongated oval-shaped body 81. The rod terminates with a first end 82 and an overlapping second end 83 on one side 85 of the body 81. The second end 83 is bent approximately perpendicularly to the longitudinal axis 84 of the fastener 80 across the fastener body 81. The second end 83 is bent around the opposite side 86 of the body 81 in a releasable fashion to form a first latch, or lock, 87 biased closed by the inherent force of the spring steel. The first end 82 is bent approximately perpendicularly to the longitudinal axis 84 of the fastener 80 away from the fastener body 81 and around the first side 82 in a releasable fashion to form a second lock 88 biased by the force of the spring steel. Other structures, such as a mobile arm 40, a spinner assembly 60, and a display member 50, can be inserted inside the snap fastener 80 when the dual locks 87, 88 are open, and the ends 82, 83 are biased back into place. The other structures are thus securely connected to the snap fastener 80.

In embodiments, as shown in FIGS. 1, 6, 9, and 10, a mobile 10 of the present invention has a plurality of display members 50 suspended from one or both ends 41 of the arm 40. The balance point 42 is located on the arm 40 at a predetermined point such that a particular combination of display members 50 is balanced. In another combination of the present invention, at least one other arm 40 is suspended from one or both ends 41 of the arm 40 with one of the freely rotatable connectors 30. Therefore, a self-centering mobile 10 of the present invention allows for display of different sizes and quantities of display members 50, such as photographs, in an asymmetric arrangement that would otherwise require excessive amounts of time, labor, and expense to determine the precise configuration necessary to balance a particular combination of photographs. An asymmetric arrangement is defined as a greater number of display members 50 on one side of an arm balance point 42 than on the other side of the balance point 42. It was discovered that to facilitate maintenance of the balance of an asymmetrical arrangement, combinations of odd numbers of display members 50 are optimal. For example, a combination of three (3) or five (5) display members 50 allow maintenance of an asymmetrical balance, thus allowing a self-centering, display member-supporting mobile 10.

Mobiles 10 of the present invention can accommodate a variety of sizes in which photographs are offered commercially, including: 2½"×3"; 3½"×5"; 4"×6"; 5"×7"; and 8"×10". Embodiments of the present invention are sometimes referred to as "photos in motion" or a "photo mobile." A display member 50 can be adapted for displaying information or a photograph from multiple sides. Such display members 50 may comprise an enclosure in which the enclosure can include, for example, two display surfaces or sides. Thus, three display members 50 having such enclosures can display six photographs, and five photograph enclosures 50 can display ten photographs.

In embodiments of the present invention, each arm 40 and display member 50 has full and continuous 360 degree rotation. In such embodiments, connectors 30 between a mobile frame 20 and horizontally disposed arms 40 and between the arms 40 and display members 50 are fully rotatable such that they have unimpeded movement throughout a full 360 degree circle and can rotate in sequential circles without interruption. As such, the present invention provides mobiles that are "freely-articulated". That is, the display members 50 can rotate fully clockwise 61 and/or counterclockwise 62 so that one display member 50 can rotate in one direction while another display member 50 on the same mobile 10 can rotate in the opposite direction at the same time.

In another aspect of the present invention, the display member 50 comprises a display enclosure 90 that includes a single, flat sheet 91 of transparent material folded over onto itself to form opposing panels 92 for receiving a substantially flat item for display between the panels 92. Mobiles 10 of the present invention are useful for displaying a flat display item such as a photograph or piece of paper with educational, directional, and/or advertising information. Embodiments of the present invention include display members 50 that can rotate a full and continuous 360 degrees. As such, display enclosures 90 having display items such as photographs and other graphic information can be displayed from more than one surface of a display member 50. The item displayed in a display enclosure 90 can be the same on both sides, or a different item can be displayed on each side of the enclosure 90. For example, a self-centering mobile 10 comprising three photograph display members 50 would allow display of six photographs, and a self-centering mobile 10 comprising five photograph display members 50 would allow display of ten photographs.

Preferably, the transparent material includes polyethylene terephthalate glycol (PETG). The panels 92 can have an aperture 94 near the top 93 and through the panels 92 for connecting the panels 92 to a freely rotatable connector 30. The panels 92 are spaced apart 95 approximately one millimeter (mm) to form a bottom 96 for supporting the display item and for facilitating movement of the display item between the panels 92. In one embodiment, at least one panel 92 has a cutout 97 near an edge of the panel 92 for facilitating insertion and removal of the display item between the panels 92.

Display enclosures 90 can be made by cutting a blank of material with a die and folding the cut blank. A hole is cut in the exact center near the top 93 edge, for example, approximately one-fourth inch from the top edge of the enclosure 90. Cutting the hole through the two layers of material when they are folded together can produce a slight fusion of the material around the edges of the hole, providing a means for holding the top 93 of the enclosure together. Alternatively, display enclosures can be injection molded. Preferably, all exterior edges of the display enclosures 90 are smoothed and the corners are rounded to facilitate manipulation by users without risk of scratching the user's hand on the enclosure 90.

Display enclosures 90 of the present invention can be made of various materials that allow viewing a displayed item, such as a photograph or other graphic image, through the material and that are of a weight appropriate for balance on a mobile. Acrylic can be used for display enclosures 90; however, acrylic becomes too heavy for enclosures that 8"×10" or larger. In addition, acrylic tends to yellow and thus not be as clear as desired for optimal viewing of a displayed item. Polyvinyl chloride (PVC) enclosures can also be used, but PVC tends to have wide color variations from batch to batch due to pigmentation irregularities. In embodiments of the present invention, display enclosures 90 are made from polyethylene teraphthalate glycol (PETG) (available commercially from Piedmont Plastics, Inc.). PETG is preferred because it retains a clear quality. In preferred embodiments, PETG is machined with a protective film on the surfaces of the material to protect against scratching during handling. To provide flat display enclosures that do not tend to warp, or "roll up," it is preferred to use sheet stock of PETG rather than a roll.

As shown in FIGS. 1, 6, 9, and 10, a mobile 10 of the present invention can include a plurality of display enclosures 50 of differing dimensions and that are oriented for vertical display 98 or for horizontal display 99. Display enclosures 90 having the same dimensions also have the same weight, and can therefore be interchanged for vertical 98 or horizontal display 99. That is, vertically-oriented display enclosures 98 and horizontally-oriented display enclosures 99, for example of the 2½"×3½" size, are each made to have the same weight. As such, each enclosure of the same size, whether vertical or horizontal, can be interchanged on a mobile arm 40. Any combination of vertical 98 and horizontal 99 enclosures of the same size can thus be used for display and maintain a self-centering balance. Accordingly, display enclosures 90 can be displayed in an asymmetric arrangement on a mobile arm 40 while maintaining a self-centering balance.

In another aspect of the present invention, a mobile 10 includes a means for mounting the frame 20 to a surface, either in a stationary or adjustable manner. Embodiments of mobiles 10 of the present invention can be mounted on a variety of surfaces. For example, such mobiles 10 can be utilized to display photographs and/or other images on a table, from a wall, on office systems mounting surfaces, on shelving, on computer terminals, and other similar surfaces. In yet another aspect of the present invention, an adjustable arm for mounting a self-centering mobile to a computer monitor or other movable surface is provided. An adjustable mounting arm includes a built-in leveling device that can be adjusted to maintain the mobile arms 40 connectors 30, and display members 50 perpendicular to the floor so that the mobile 10 will be self-centering and balanced.

One such means 100 for mounting a frame 20 in a stationary manner includes an oblong block 101 of material having a bore hole 106 extending at least partially downward through the block 101 toward the bottom 103 for fittingly receiving the frame 20. A threaded hole 107 extends through the front 104 of the block 101 approximately perpendicularly to and intersecting with the bore hole 106. A screw 108 can be threaded through the threaded hole 107 for tightening against the frame 20 to secure the frame 20 in the bore hole 106. The screw 108 for securing the frame 20 in the bore hole 106 can be a round-headed screw with a knurled surface for ease of manual turning. The screw 108 can also be slotted for final turning with a screw driver to achieve a tighter, more secure contact with the frame 20.

Another embodiment of a means 120 for mounting the frame to a surface allows the frame to be mounted in an adjustable manner. For example, a block 121 of material has two holes extending at least partially through the block 121 in approximately perpendicular directions. One hole is a bore hole 106 for fittingly receiving the frame 20. The other hole is a threaded hole 107 intersecting with the bore hole 106. A first screw 122 is inserted into the threaded hole 107 for tightening against the frame 20 to secure the frame 20 in the bore hole 106. A second screw 126 is inserted through another hole 127 in the block perpendicular to the bore hole 106 and through a threaded hole (not shown) in the block-mounting portion 125 of a bracket 123. As such, the block 121 and frame 20 can be adjusted and secured in a range of positions within an approximately 90 degree angle 128 around an upright position.

Another embodiment for adjustably mounting the frame to a surface includes a circular block 130 of material having a plurality of holes about the circumference 131 that extend at least partially through the block 130 in approximately perpendicular directions. Each pair of holes includes a bore hole 106 for fittingly receiving the frame 20 and a threaded hole 107 intersecting with the bore hole 106. A first screw 122 can be inserted into the threaded hole 107 for tightening against the frame 20 to secure the frame 20 in the bore hole 106. A second screw 126 can be inserted through another threaded hole 127 in the circular block 130 perpendicular to the plurality of paired bore holes 106 and threaded holes 107 and into a threaded hole (not shown) in the front 133 of a rectangular block 132. Accordingly, the circular block 130 and frame 20 can be adjustably secured in a range of positions within a 360 degree span. The materials from which the blocks 101, 121, 130 utilized in the mounting systems are made can be a light weight metal, such as aluminum.

In either of these means for mounting the frame 20 to a surface, such as a wall or desk, a means 109 for mounting the block 101, 121, 130 to a surface is provided. The means 109 for mounting such a block 101, 121, 130 to a surface can be an adhesive 110 applied to the back of the block 101, 121, 130 for attaching the block 101, 121, 130 and frame 20 to the surface. One such removable adhesive is the "Command" adhesive commercially available from 3M.

In alternative embodiments, a mobile 10 of the present invention can be mounted to a music box or other rotational table display for supporting and rotating a mobile 10.

Embodiments of the present invention include methods of using a self-centering mobile 10. One such embodiment includes the steps of providing a frame 20, a plurality of freely rotatable connectors 30, and a horizontally disposed arm 40 comprising a round rod 44 of spring steel 45 and a substantially closed loop 43 at each of two ends 41 and at a balance point 42 between the two ends 41. The arm 40 can be suspended from the frame 20 at the balance point 42 with one of the freely rotatable connectors 30. A display member 50 can be suspended from each end 41 of the arm 40 with another one of the freely rotatable connectors 30. The display members 50 have a weight so that the arm 40 is balanced when suspended from the frame 20 at the arm balance point 42.

In another embodiment of a method, the arm 40 can be suspended from the frame 20 and the display member 50 can be suspended from each end of the arm 40 with a spring clip 70 formed from a round rod 44 of spring steel into a substantially closed "S" shape 73. Each end of the rod is bent outwardly from the spring clip 70 to form a receiving channel 75 for receiving the frame 20 and the arm 40. One of the spring clips 70 is attached to the top 64 and another spring clip 70 is attached to the bottom 65 of a spinner assembly 60. The spinner assembly 60 is adapted to rotate freely for 360 degrees in both clockwise 61 and counter-clockwise 62 directions. A plurality of display members 50 can be suspended from at least one end 41 of the arm 40, and the balance point 42 is located on the arm 40 at a pre-determined point such that a particular combination of display members 50 is balanced. At least one other arm 40 can be suspended from at least one end 41 of the arm 40 with one of the freely rotatable connectors 30.

In another aspect of the present invention, a mobile 10 comprising a plurality of mobile arms 40, connectors 30, and display members 50 is pre-assembled and packaged for retail sale. The pre-assembled and packaged mobile 10 can include sample display items, such as photographs, in display enclosures 90 to demonstrate how the enclosures 90 are to be used by the consumer. As such, embodiments of the present invention having multiple components that interact to provide a self-centering, balanced, fully freely rotatable mobile 10 are provided to consumers for immediate and easy installation and use. Another aspect of the pre-assembled feature of mobiles 10 of the present invention is that the substantially closed loops 43 of the arms 40 and the biasing nature of the spring steel 72 in spring clips 70 prevents the components from separating from each other after being assembled prior to packaging. In such a manner, embodiments comprising advertising information can be shipped ready for retail display. Alternatively, a mobile 10 can be packed in a mailer and then readily displayed by the recipient of the mailer.

Although the present invention has been described with reference to particular embodiments, it should be recognized that these embodiments are merely illustrative of the principles of the present invention. Those of ordinary skill in the art will appreciate that a self-centering mobile of the present invention may be constructed and implemented in other ways and embodiments. Accordingly, the description herein should not be read as limiting the present invention, as other embodiments also fall within the scope of the present invention.

What is claimed is:

1. A self-centering mobile, comprising:

a frame;

a plurality of freely rotatable connectors;

a horizontally disposed arm having two ends and a balance point between the two ends, the arm suspended from the frame at the balance point with one of the freely rotatable connectors; and a display member suspended from each end of the arm with another one of the freely rotatable connectors and having a weight so that the arm is balanced when suspended from the frame at the arm balance point, wherein the freely rotatable connectors comprise a spinner assembly adapted to rotate freely for 360 degrees in both clockwise and counter-clockwise directions and a means for attaching the spinner assembly to the frame and to the arm, and wherein the means for attaching the spinner assembly to the frame and to the arm comprises a dual lock snap fastener comprising a round rod of spring steel formed into an elongated oval-shaped body, the rod terminating with a first end and an overlapping second end on a first side of the body, wherein the second end is bent approximately perpendicularly to a longitudinal axis of the fastener across the fastener body and releasably around a second side of the body opposite the first side to form a first lock biased by the spring steel, and wherein the first end is bent approximately perpendicularly to the longitudinal axis of the fastener away from the fastener body and releasably around the first side to form a second lock biased by the spring steel.

2. A self-centering mobile, comprising:

a frame;

a plurality of freely rotatable connectors;

a horizontally disposed arm comprising a round rod of zinc-coated spring steel and having two ends and a balance point between the two ends, the arm suspended from the frame at the balance point with one of the freely rotatable connectors; and a display member suspended from each end of the arm with another one of the freely rotatable connectors and having a weight so that the arm is balanced when suspended from the frame at the arm balance point, wherein the arm comprises a substantially closed loop at the balance point and at each end of the arm, wherein the freely rotatable connectors comprise a spinner assembly adapted to rotate freely for 360 degrees in both clockwise and counter-clockwise directions and further comprising a hollow central body having an aperture in each of a top and a bottom of the central body and an eye hook disposed in each of the top and the bottom, each eye hook having a base larger than the apertures rotatably secured inside the central body and a hook portion extending through the aperture, and a spring clip for attaching the spinner assembly to the frame and to the arm formed from a round rod of zinc-coated spring steel, the rod formed into a substantially closed "S" shape, each end of the rod bent outwardly from the spring clip to form a receiving channel for receiving the frame and the arm.

3. The mobile of claim 2, wherein a plurality of display members is suspended from at least one end of the arm, the balance point located on the arm at a pre-determined point such that a particular combination of display members is balanced.

4. The mobile of claim 3, wherein at least one other arm is suspended from at least one end of the arm with one of the freely rotatable connectors.

5. The mobile of claim 2, wherein the display member comprises a display enclosure comprising:

a single, flat sheet of transparent material folded over onto itself to form opposing panels for receiving a substantially flat item for display therebetween;

the panels having a top and an aperture near the top and through the panels for connecting the panels to a freely rotatable connector;

the panels spaced apart approximately one mm to form a bottom for supporting the display item and for facilitating movement of the display item between the panels; and at least one panel having a cutout near an edge of the panel for facilitating insertion and removal of the display item between the panels.

6. The mobile of claim 5, wherein the sheet of transparent material comprises polyethylene terephthalate glycol.

* * * * *